United States Patent
Jarosz et al.

(10) Patent No.: US 9,846,676 B2
(45) Date of Patent: Dec. 19, 2017

(54) METHOD AND APPARATUS FOR CONVERTING SPHERICAL HARMONICS REPRESENTATIONS OF FUNCTIONS INTO MULTI-RESOLUTION REPRESENTATIONS

(71) Applicant: Adobe Systems Incorporated, San Jose, CA (US)

(72) Inventors: Wojciech Jarosz, La Jolla, CA (US); Nathan A. Carr, San Jose, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 15/618,673

(22) Filed: Jun. 9, 2017

(65) Prior Publication Data
US 2017/0277657 A1    Sep. 28, 2017

Related U.S. Application Data

(63) Continuation of application No. 12/354,583, filed on Jan. 15, 2009, now Pat. No. 9,703,756.
(60) Provisional application No. 61/094,789, filed on Sep. 5, 2008.

(51) Int. Cl.
| | |
|---|---|
| *G06T 15/50* | (2011.01) |
| *G06F 17/14* | (2006.01) |
| *G06T 19/00* | (2011.01) |

(52) U.S. Cl.
CPC ............ *G06F 17/14* (2013.01); *G06T 19/00* (2013.01); *G06T 2210/36* (2013.01)

(58) Field of Classification Search
None
See application file for complete search history.

(56) References Cited

U.S. PATENT DOCUMENTS

| | | |
|---|---|---|
| 7,589,725 B2 | 9/2009 | Snyder et al. |
| 9,703,756 B2 | 7/2017 | Jarosz et al. |
| 2013/0120384 A1 | 5/2013 | Jarosz |

OTHER PUBLICATIONS

"Advisory Action", U.S. Appl. No. 12/354,583, dated Mar. 21, 2012, 3 pages.
"Examiner's Answer to Appeal Brief", U.S. Appl. No. 12/354,583, dated Jul. 24, 2014, 34 pages.
"Final Office Action", U.S. Appl. No. 12/354,583, dated Jan. 12, 2012, 28 pages.
"Final Office Action", U.S. Appl. No. 12/354,583, dated Dec. 20, 2012, 30 pages.

(Continued)

*Primary Examiner* — Peter Hoang
(74) *Attorney, Agent, or Firm* — Wolfe-SBMC

(57) ABSTRACT

An analytical method to efficiently convert a function that is stored in spherical harmonics into a function that is stored in a wavelet or mip map representation enables a variety of computer graphics functions to be efficiently performed. A function may be stored as a spherical harmonic representation and rotated in the spherical harmonic domain; the function can then be converted to a wavelet representation. The conversion method may be used to convert a spherical harmonic function to wavelets, and then an importance sampling technique may be applied to the wavelet representation to generate a set of importance samples for the function. The conversion method may be applied to convert a spherical harmonic representation into the wavelet domain, and an importance sampling technique may then be applied which samples the product of the function and another function in the wavelet domain.

20 Claims, 10 Drawing Sheets

(56) References Cited

OTHER PUBLICATIONS

"Final Office Action", U.S. Appl. No. 12/354,583, dated Dec. 30, 2013, 30 pages.
"Non-Final Office Action", U.S. Appl. No. 12/354,583, dated Jul. 17, 2013, 32 pages.
"Non-Final Office Action", U.S. Appl. No. 12/354,583, dated Aug. 3, 2012, 30 pages.
"Non-Final Office Action", U.S. Appl. No. 12/354,583, dated Sep. 7, 2011, 28 pages.
"Notice of Allowance", U.S. Appl. No. 12/354,583, dated Mar. 9, 2017, 7 pages.
"PTAB Decision", U.S. Appl. No. 12/354,583, dated Dec. 15, 2016, 8 pages.
Agarwal,"Structured Importance Sampling of Environment Maps", ACM Transactions on Graphics, 2003, 8 pages.
Ashikhmin,"An Anisotropic Phong BRDF Model", J. Graph. Tools 5, 2000, 8 pages.
Blasi,"A Rendering Algorithm for Discrete Volume Density Objects", Computer Graphics Forum (Eurographics '93), 1993, 10 pages.
Burke,"Bidirectional Importance Sampling for Illumination from Environment Maps", Siggraph '04; ACM Siggraph 2004 Sketches (New York, NY, UA); ACM, 2004, 1 page.
Cabral,"Bidirectional Reflection Functions from Surface Bump Maps", In Computer Graphics (Proceedings of ACM SIGGRAPH 87); ACM; ACM Press, 1987, 9 pages.
Choi,"Rapid and Stable Determination of Rotation Matrices between Spherical Harmonics by Direct Recursion", Journal of Chemical Physics, 1999, 7 pages.
Clarberg,"Practical Product Importance Sampling for Direct Illumination", Computer Graphics Forum (Proceedings of Eurographics 2008), 2008, 10 pages.
Clarberg,"Wavelet Importance Sampling: Efficiently Evaluating Products of Complex Functions", ACM Transactions on Graphics, 2005, 10 pages.
Claustres,"BRDF Measurement Modelling Using Wavelets for Efficient Path Tracing", Computer Graphics Forum, Dec. 2003, 16 pages.
Claustres,"Wavelet-Based Modelling of Spectral BRDF Data", Optical Engineering, 2004, 57 pages.
Cline,"Two Stage Importance Sampling for Direct Lighting", In Rendering Techniques 2006; 17th Eurographics Workshop on Rendering, Jun. 2006, 12 pages.
Cohen,"LightGen Plugin:", HDRShop plugin; retrieved from http://gl.ict.usc.edu/HDRShop/lightgen/ from WayBack machine (www.archive.org), May 1, 2008, 3 pages.
Cook,"A Reflectance Model for Computer Graphics", ACM Transactions on Graphics, Jan. 1982, 18 pages.
Cook,"Stochastic Sampling in Computer Graphics", ACM Transactions on Graphics (TOG), Jan. 1986, 22 pages.
DiDonato,"Recurrence Relations for the Indefinite Intergrals of the Associated Legendre Functions", Mathematics of Computation 38, Apr. 1982, 5 pages.
Edwards,"The Half-way Vector Disk for BRDF Modeling", ACM Trans. Graph, 2006, 19 pages.
Gortler,"Wavelet Radiosity", In Proceedings of ACM SIGGRAPH 93 (New York, NY, USA), 1993, 10 pages.
Green,"Spherical Harmonic Lighting: The Gritty Details", Archives of the Game Developers Conference, Mar. 2003, 47 pages.
Han,"Frequency Domain Normal Map Filtering", ACM transactions on Graphics (TOG); Proceedings of ACM SIGGRAPH 2007; vol. 26; Issue 3, Jul. 2007, 11 pages.
Kautz,"Advanced Environment Mapping in VR Applications", Eurographics Partner Event OpenSG2003; Concepts and Components of Software Frameworks for Interactive 3D Graphics, 2003, 8 pages.

Kautz,"Fast, Arbitrary BRDF Shading for Low-Frequency Lighting Using Spherical Harmonics", In Proceeding of the 13th Eurographics Workshop on Rendering; Eurographics Association, 2002, 7 pages.
Kollig,"Efficient Illumination by High Dynamic Range Images", In Eurographics Symposium on Rendering; Eurographics Association, 2003, 8 pages.
Krivanek,"Radiance Caching for Efficient Global Illumination Computation", IEEE Transactions on Visualization and Computer Graphics, 2005, 11 pages.
Lafortune,"Non-Linear Approximation of Reflectance Functions", In Proceedings of ACM SIGGRAPH 97; ACM Press, 1997, 10 pages.
Lalonde,"Representations and Uses of Light Distribution Functions", PhD thesis; University of British Columbia, Dec. 1997, 146 pages.
Lawrence,"Efficient BRDF Importance Sampling Using a Factored Representation", ACM Transactions on Graphics, 2004, 10 pages.
Liu,"All-Frequency Precomputed Radiance Transfer for Glossy Objects", In Rendering Techniques 2004; Eurographics Workshop on Rendering, Jun. 2004, 8 pages.
Matusik,"A Data-Driven Reflectance Model", In SIGGRAPH '03; ACM SIGGRAPH 2003 Papers (New York NY, USA, 2003); ACM, 2003, 11 pages.
Matusik,"A Data-Driven Reflectance Model", PhD thesis, 2003, 115 pages.
Mitchell,"Spectrally Optimal Sampling for Distribution Ray Tracing", Proceedings of the 18th Annual Conference on Computer Graphics and Interactive Techniques, 1991, 12 pages.
Mousa,"Direct Spherical Harmonic Transform of a Triangulated Mesh", Journal of Graphics Tools, 2006, 9 pages.
Ng,"All-Frequency Shadows Using Non-linear Wavelet Lighting Approximation", ACM Trans. Graph., 2003, 6 pages.
Ng,"Triple Product Wavelet Integrals for All-Frequency Relighting", In SIGGRAPH '04; ACM SIGGRAPH 2004 Papers (New York, NY, USA, 2004); ACM, 2004, 11 pages.
Ostromoukhov,"Fast Hierarchical Importance Sampling with Blue Noise Properties", ACM Transactions on Graphics, 2004, 8 pages.
Paul,"Recurrence Relations for Integrals of Associated Legendre Functions", Bulletin Geodesique, 1978, 14 pages.
Pinchon,"Rotation Matrices for Real Spherical Harmonics: General Rotations of Atomic Orbitals in Space-Fixed Axes", Journal of Physics A: Mathematical and Theoretical, Oct. 16, 2006, 15 pages.
Ramamoorthi,"Frequency Space Environment Map Rendering", ACM Transactions on Graphics, 2002, 10 pages.
Schroder,"Spherical Wavelets: Efficiently Representing Functions on the Sphere", Wavelets in the Geosciences; Lecture Notes in Earth Sciences; vol. 90/2000, 2000, 12 pages.
Shirley,"Discrepancy as a Quality Measure for Sample Distributions", In Eurographics '91; Elsevier Science Publishers; Amsterdam, North-Holland, 1991, 7 pages.
Shirley,"Physically Based Lighting Calculations for Computer Graphics", PhD thesis; University of Illinois at Urbana-Champaign, 1991, 183 pages.
Sloan,"Precomputed Radiance Transfer for Real-Time Rendering in Dynamic, Low-Frequency Lighting Environments", ACM Trans. Graph, 2002, 10 pages.
Sloan,"Stupid Spherical Harmonics (SH) Tricks", Game Developers Conference, Feb. 2008, 42 pages.
Subr,"Steerable Importance Sampling", Interactive Ray Tracing; RT'07; IEEE Symposium, Sep. 2007, 8 pages.
Sun,"Generalized Wavelet Product Integral for Rendering Dynamic Glossy Objects", ACM Transactions on Graphics, 2006, 12 pages.
Talbot,"Importance Resampling for Global Illumination", In Rendering Techniques; Eurographics Association, 2005, 8 pages.
Torrance,"Theory for Off-Specular Reflection from Roughened Surfaces", Journal of the Optical Society of America (1917-1983), Sep. 1967, 10 pages.
Veach,"Optimally Combining Sampling Techniques for Monte Carlo Rendering", Proceedings of the 22nd Annual Conference on Computer Graphics and Interactive Techniques, 1995, 10 pages.
Ward,"Measuring and Modeling Anisotropic Reflection", SIGGRAPH Computer Graphics, 1992, 8 pages.

|  | Spherical Harmonics | Haar Wavelets |
|---:|:---:|:---:|
| Convolution | ✓ |  |
| Product | ✓ | ✓ |
| Product Integral | ✓ | ✓ |
| Rotation | ✓ |  |
| Alias-free | ✓ |  |
| High Frequency |  | ✓ |
| Low Frequency | ✓ | ✓ |
| Importance Sampling |  | ✓ |

FIG. 1

(Prior Art)

|  | Spherical Harmonics | Haar Wavelets |
|---:|:---:|:---:|
| Convolution | ✓ |  |
| Product | ✓ | ✓ |
| Product Integral | ✓ | ✓ |
| Rotation | ✓ |  |
| Alias-free | ✓ |  |
| High Frequency |  | ✓ |
| Low Frequency | ✓ | ✓ |
| Importance Sampling | ✓ | ✓ |

FIG. 2

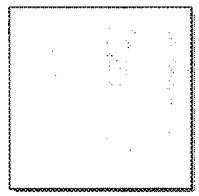
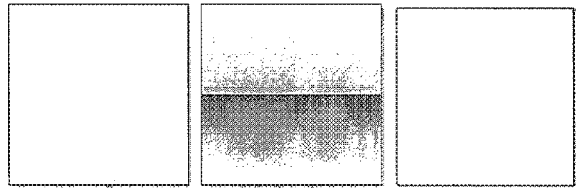
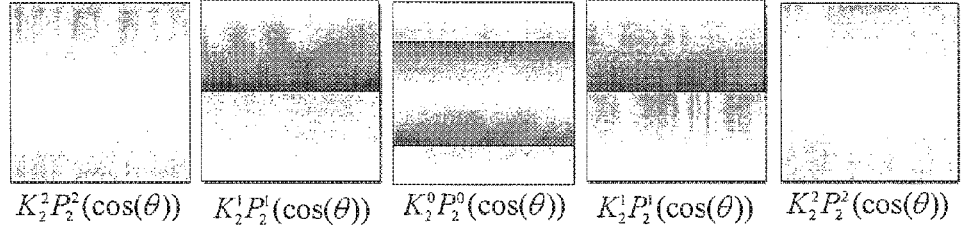
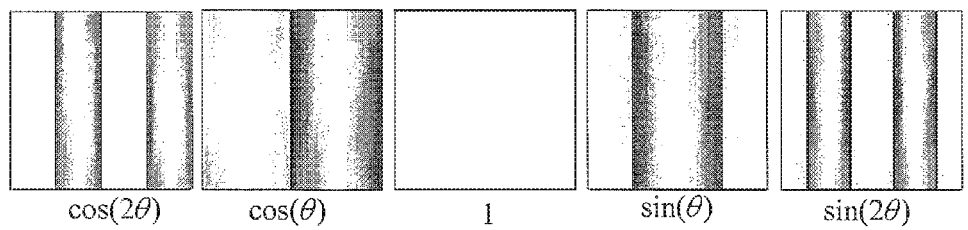
FIG. 7

Algorithm 1: ASSOCLEGENDREINTEGRAL($n$, $Pa$, $Pb$, $a$, $b$)

Data: $n$ is the number of bands to evaluate.
Data: $Pa[l,m]$ is an array of all associated Legendre functions evaluated at $a$.
Data: $Pb[l,m]$ is an array of all associated Legendre functions evaluated at $b$.
Data: $[a,b)$ is the integration interval.
Result: $\hat{P}[l,m]$ is a array of integral results, evaluated for $l \geq 0$ and $0 \leq m \leq l$.

// Evaluate Equation 14:
1  $\hat{P}[0,0] = b - a$;
2  if $n = 1$ then
3      return;

// Evaluate Equations 15 and 16:
4  $\hat{P}[1,0] = \frac{b^2 - a^2}{2}$;
5  $\hat{P}[1,1] = \frac{1}{2}\left(b\sqrt{1-b^2} + \mathrm{asin}(b) - a\sqrt{1-a^2} + \mathrm{asin}(a)\right)$;
6  for $l = 2$ to $n - 1$ do
7      for $m = 0$ to $l - 2$ do
       // Evaluate Equation 12:
8         $g(x) := (2l - 1)(1 - x^2)Px[l - 1, m]$;
9         $\hat{P}[l,m] = \frac{(l-2)(l-1+m)\hat{P}[l-2,m] - g(b) + g(a)}{(l+1)(l-m)}$;

// Evaluate special case of Equation 12:
10     $\hat{P}[l,l-1] = \frac{2l-1}{l+1}\left((1-a^2)Pa[l-1,l-1] - (1-b^2)Pb[l-1,l-1]\right)$;
    // Evaluate Equation 13:
11     $\hat{P}[l,l] = \frac{1}{l+1}\left(l(2l-3)(2l-1)\hat{P}[l-2,l-2] + bPb[l,l] - aPa[l,l]\right)$;

12 return;

FIG. 8

Algorithm 2: MULTIANGLESINCOS($n$, $\phi$)

Data: $n$ is the number of bands to evaluate.
Data: $\phi$ is a polar angle.
Result: $S[m]$ is an array containing $\sin(m\phi)$ for all $0 \leq m < n$.
Result: $C[m]$ is an array containing $\cos(m\phi)$ for all $0 \leq m < n$.

// Initialize recurrence:
1  $S[0] = 0$;   $S[1] = \sin(\phi)$;
2  $C[0] = 1$;   $C[1] = \cos(\phi)$;
// Evaluate recurrence:
3  for $m = 2$ to $n - 1$ do
4      $S[m] = 2S[m-1]C[1] - S[m-2]$;
5      $C[m] = 2C[m-1]C[1] - C[m-2]$;
6  return;

FIG. 9

METHOD AND APPARATUS FOR CONVERTING SPHERICAL HARMONICS REPRESENTATIONS OF FUNCTIONS INTO MULTI-RESOLUTION REPRESENTATIONS

RELATED APPLICATIONS

This application is a continuation of and claims priority to U.S. patent application Ser. No. 12/354,583 filed Jan. 15, 2009 entitled "Method and Apparatus for Converting Spherical Harmonics Representations of Functions into Multi-Resolution Representations," which claims priority to U.S. Provisional Patent Application Ser. No. 61/094,789 filed Sep. 5, 2008 entitled "Method and Apparatus for Importance Sampling Spherical Harmonics in Computer Graphics." These disclosures are incorporated by reference herein in their entirety.

BACKGROUND

Illumination Functions

In 3-D computer graphics, techniques exist that attempt to capture the way in which light interacts in the real world. Such techniques may take into account, at locations on a surface in a scene, the light that comes directly from a light source (direct lighting, or direct illumination), and light rays from one or more light sources reflected by other surfaces in the scene (indirect illumination) to determine global illumination for the locations. A reflectance function may be applied to a surface to determine reflectance at locations of the surface; this reflectance may, for example, be used in determining indirect illumination at locations of the scene. Given a direction from a perspective point, and given incoming light from another direction or directions, a reflectance function may determine how much light is reflected from a surface towards the perspective point. An example of a reflectance function is the bidirectional reflectance distribution function (BRDF).

Environment Maps

In computer graphics, it is common to have functions that need to be represented or defined over a sphere, or a space. For example, a user might want to load an image and have it wrapped over a sphere, and assume that the image is lighting a scene within the sphere. A function may encode, at every pixel location in the scene, the intensity of light that is coming in from the environment represented by the image. The wrapped image may be referred to as an environment map. In this example, the environment map is used for lighting the scene within the sphere. However, environment maps may be used for other purposes than lighting in computer graphics, and other functions than a lighting function may be used with environment maps.

There may be various techniques to approximate these functions over a sphere. For example, the function may be given a direction, represented by the azimuth and polar angle, around the sphere. The function returns a value for the input direction. In the case of a lighting function, for a given azimuth and polar angle on the environment map, the function returns an intensity. In the case of a pixel representation with multiple channels, e.g. RGB pixels, the function may be applied separately to each pixel channel, e.g. to R, G and B separately for RGB pixels.

Work has been done on compressing, encoding, and representing these spherical signals or functions defined over a sphere. Two such representations are spherical harmonics and wavelets.

Spherical Harmonics

Spherical harmonics are a frequency-space basis for representing functions defined over a sphere. Spherical harmonics have been studied extensively, and have widespread applicability to many physical problems ranging from atomic electron configurations in physical chemistry, to the representation of gravitational and magnetic fields of planetary bodies in geodesy. Spherical harmonics also appear in quantum mechanics as the solutions of the Schrödinger equation in spherical coordinates.

In computer graphics, many quantities are naturally defined over the spherical or hemispherical domain, making spherical harmonics a natural basis for these computations. Furthermore, spherical harmonics have many convenient properties that lead to efficient implementations for convolutions, rotations, and double product integrals. Consequently, spherical harmonics have found recent popularity in computer graphics in the area of precomputed radiance transfer (PRT) techniques, and have also been used heavily in related domains such as radiative transfer. These properties and operations of spherical harmonics in the prior art are summarized in the table illustrated in FIG. 1, which summarizes and compares capabilities of spherical harmonics and Haar wavelets according to prior art.

Wavelets

Another class of basis functions that may be used in computer graphics is wavelets. Whereas spherical harmonics decompose functions into independent frequency bands, wavelets hierarchically decomposing functions into components that are localized in both frequency and space. Due to their simplicity, Haar wavelets have received much attention in computer graphics research. Haar wavelets, for example, have been successfully applied to PRT and radiosity computation. Furthermore, Haar wavelets support efficient sampling using a simple hierarchical warping technique.

Haar wavelets and spherical harmonics share many of the same strengths. FIG. 1 shows a table that summarizes and compares capabilities of spherical harmonics and Haar wavelets according to the prior art. Haar wavelets can more efficiently approximate high-frequency functions; however, they do not support efficient rotations and may produce distracting aliasing artifacts. Spherical harmonics, on the other hand, support efficient rotation and are efficient for representing low-frequency functions. Spherical harmonics do not suffer from the same aliasing artifacts as Haar wavelets but instead exhibit error in the form of "ringing".

Importance Sampling

Generating samples according to the intensity distribution of a function is a useful operation in many disciplines. In Monte Carlo techniques, this takes the form of importance sampling and can be used to significantly reduce variance in numerical integration. Importance sampling techniques also have widespread use outside of Monte Carlo rendering. For example, importance sampling techniques can be used in non-photorealistic rendering, artificial stippling, and procedural geometry placement. It may be beneficial to also enforce certain quality measures on the resulting sample distribution in order to reduce variance further or simply to obtain more visually pleasing distributions.

Mip Maps

In computer graphics, a mip map (also referred to as MIP map or mipmap) is a technique for storing multiple resolutions of a single image. Typically this includes the original high-resolution image, plus successive copies of the image reduced in resolution by a factor of 2 in each dimension. This collection of images forms an "image-pyramid" where the level in the pyramid determines the resolution and level-of-detail of the image.

SUMMARY

Embodiments of a method and apparatus for converting spherical harmonics representations of functions to multi-resolution representations, such as wavelet representations and mip map representations, are described. In computer graphics, reflectance functions on surfaces tend to be smooth and low-frequency; thus, these functions are effectively stored as spherical harmonic representations. On the other hand, wavelets are a good basis for environment maps because environment maps tend to be high-frequency. Embodiments may implement a method to efficiently convert a function that is stored in spherical harmonics into a function that is stored in a multi-resolution representation. Embodiments may implement a method to efficiently convert a function that is stored in spherical harmonics into a function that is stored in wavelets, for example Haar wavelets. Implementations of this method perform the conversion from a spherical harmonic representation to a wavelet representation efficiently and analytically. Implementations of this method may also perform conversion from a spherical harmonic representation to a mip map representation.

The analytic method for converting from a spherical harmonic representation to a wavelet or mip map representation enables embodiments to perform a variety of computer graphics tasks, and to perform computer graphics tasks more efficiently than could be done in conventional techniques. For example, one or the other of the environment map or the reflectance function may need to be rotated so that the two can be aligned. Since a spherical harmonic representation can be efficiently rotated, a function may be stored as a spherical harmonic representation and rotated in the spherical harmonic domain; the function can then be converted to a wavelet representation, for example a Haar wavelet representation if necessary. This may all be performed efficiently throughout the rendering pipeline. As another example, there is no conventional, efficient method for importance sampling spherical harmonics. The Haar wavelet domain does have efficient methods for importance sampling. Since there are methods to importance sample wavelets (e.g., Haar wavelets), embodiments may use an analytic conversion method to take the spherical harmonic function, convert the spherical harmonic function to Haar wavelets, and then apply an importance sampling technique for Haar wavelets to the Haar wavelet representation to generate a set of importance samples for the function. The end result is a set of sample rays in different directions over a sphere or hemisphere.

Thus, embodiments enable quick and efficient rotation since spherical harmonics representations can be efficiently rotated, provide a method to analytically convert from one representation to another on the fly, and enable importance sampling of spherical harmonics by efficiently converting from a spherical harmonic representation to a Haar wavelet representation and performing the importance sampling on the Haar wavelet representation. Generally speaking, embodiments may store different functions in different representations, and combine them together in different ways, with the analytic conversion method used to efficiently convert from one basis to the other.

In addition, the methods for conversion of function representations and for importance sampling may be used in embodiments to importance sample the product of two Haar wavelets. Some conventional techniques store both the lighting (environment map) and the reflectance in the Haar wavelet domain, and thus may importance sample the product of the two. However, these conventional techniques suffer from various limitations; for example, there is no efficient way to rotate a Haar wavelet representation. Embodiments may directly use the analytic conversion method in this case. One of the two functions, for example a reflectance function, may be represented in the spherical harmonic domain. The analytic conversion method may be applied to perform a fast conversion of the function into the Haar wavelet domain, and an importance sampling technique may then be applied which samples the product of the two functions in the Haar wavelet domain.

BRIEF DESCRIPTION OF THE DRAWINGS

FIG. 1 shows a table that summarizes and compares capabilities of spherical harmonics and Haar wavelets according to prior art.

FIG. 2 shows a table that summarizes and compares capabilities of spherical harmonics and Haar wavelets according to embodiments.

FIG. 3A illustrates importance sampling a reflectance function according to one embodiment.

FIG. 3B illustrates Haar wavelet importance sampling on an environment map according to embodiments.

FIG. 3C illustrates importance sampling the product of a spherical harmonic function and a Haar wavelet function according to one embodiment.

FIG. 7 illustrates the separation of spherical harmonic basis functions.

FIGS. 8 and 9 illustrate examples of pseudo-code for recurrence procedures that may be used in embodiments.

FIG. 10A is a flowchart of a method of performing rotation and importance sampling according to one embodiment.

FIG. 10B is a flowchart of a method of importance sampling the product of two functions according to one embodiment.

Figure 3A:
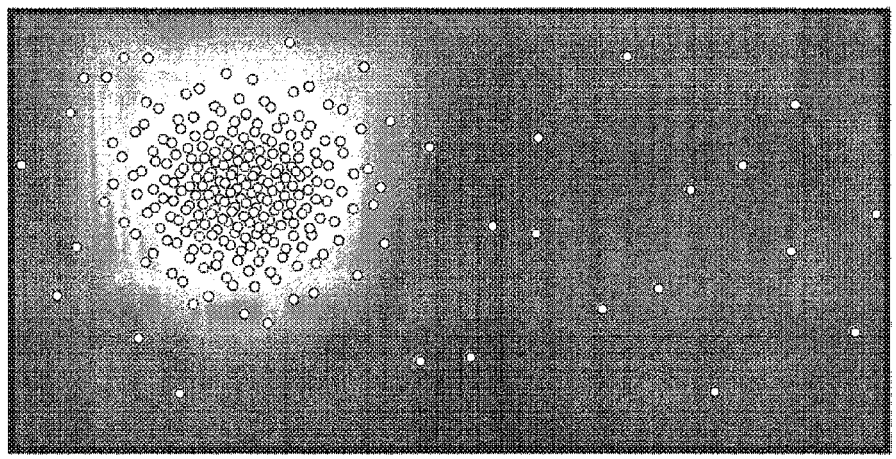
FIGS. 3A through 3C graphically illustrate aspects of importance sampling according to embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of a method and apparatus for converting spherical harmonics representations of functions to multi-resolution representations, such as wavelet representations and mip map representations, are described. Given a valid probability density function (PDF) represented as a vector of spherical harmonic coefficients, embodiments of the method may warp an input point set to match the target PDF using hierarchical sample warping. This approach is efficient and produces high quality sample distributions. As a by-product of the sampling procedure, embodiments may produce a multi-resolution representation of the spherical harmonic function as either a spherical mip map representation or wavelet representation (e.g., Haar wavelet representation). By exploiting this implicit conversion, the method may be extended in embodiments to distribute samples according to the product of a spherical harmonic function with a spherical mip map or a wavelet (e.g., a Haar wavelet). This generalization has immediate applicability in rendering, in, for example, importance sampling the product of a bidirectional reflectance distribution function (BRDF) and an environment map where the lighting (the environment map) is stored as a single high-resolution wavelet and the BRDF is represented in spherical harmonics. Since spherical harmonics can be efficiently rotated, this product can be computed on-the-fly even if the BRDF is stored in local-space. Thus, embodiments may seamlessly combine the strengths of spherical harmonics and wavelets, and, compared to conventional techniques, embodiments may significantly reduce precomputation time and storage requirements.

There are no conventional techniques for efficiently importance sampling spherical harmonics. Embodiments address this and other limitations of conventional techniques by implementing a number of techniques as described herein to bridge the gap between the capabilities of spherical harmonics and Haar wavelets.

Embodiments may provide a high-quality importance sampling method for spherical harmonics. As described herein, the importance sampling method for spherical harmonics can be used to sample the product of a spherical harmonic function and a Haar wavelet function, thus bridging the gap between spherical harmonics and Haar wavelets. This product can be evaluated efficiently on-the-fly with little or no precomputation, and allows for high-frequency content in one function, and efficient rotation of the other. Such a situation is common in compute graphics when, for example, convolving a smooth bidirectional reflectance distribution function (BRDF) with a high frequency environment map. Embodiments may provide one or more of, but not limited to, the following:

An analytic conversion between spherical harmonics and multi-resolution representations (spherical mip maps/wavelets).

A method to rotate and align a function represented by spherical harmonics with, for example, a function represented by wavelets.

An importance sampling method for spherical harmonic functions.

A method for sampling the product of spherical harmonics and wavelets.

In computer graphics, the reflectance functions on surfaces tend to be smooth and low-frequency; thus, these functions are effectively stored as spherical harmonic representations. On the other hand, wavelets are a good basis for environment maps because environment maps tend to be high-frequency.

Embodiments may implement a method to efficiently convert a function that is stored in spherical harmonics into a function that is stored in wavelets, for example Haar wavelets. See, for example, equations 6 and 10 provided later in this document. Implementations of this method may perform the conversion from a spherical harmonic representation to a Haar wavelet representation efficiently and analytically.

FIG. 2 shows a table that summarizes and compares capabilities of spherical harmonics and Haar wavelets according to embodiments. Note that, in contrast to the table illustrated in FIG. 1, FIG. 2 shows importance sampling for spherical harmonics, a capability that is enabled by embodiments as described herein. The efficient analytic method for converting from a spherical harmonic representation to a Haar wavelet representation enables embodiments to perform a variety of computer graphics tasks, and to perform computer graphics tasks more efficiently than could be done in conventional techniques. For example, one or the other of the environment map or the reflectance function needs to be rotated so that the two can be aligned. Since a spherical harmonic representation can be efficiently rotated, a function may be stored as a spherical harmonic representation and rotated in the spherical harmonic domain; the function can then be converted to a Haar wavelet representation if necessary. This may all be performed efficiently throughout the rendering pipeline. As another example, there is no conventional, efficient method for importance sampling spherical harmonics. The Haar wavelet domain does have efficient methods for importance sampling. Since there are methods to importance sample Haar wavelets, embodiments may use the analytic conversion method to take the spherical harmonic function, convert the spherical harmonic function to Haar wavelets, and then apply an importance sampling technique for Haar wavelets to the Haar wavelet representation to generate a set of importance samples for the function. The end result is a set of sample rays in different directions over a sphere or hemisphere.

Thus, embodiments may enable quick and efficient rotation since spherical harmonics representations can be efficiently rotated, may provide a method to analytically convert from one representation to another on the fly, and may enable importance sampling of spherical harmonics by efficiently converting from a spherical harmonic representation to a Haar wavelet representation and performing the importance sampling on the Haar wavelet representation. Generally speaking, embodiments may store different functions in different representations, and combine them together in different ways, with the analytic conversion method used to efficiently convert from one basis to the other.

In addition, the methods conversion of function representations and for importance sampling may be used to importance sample the product of two Haar wavelets. Some conventional techniques store both the lighting (environment map) and the reflectance in the Haar wavelet domain, and thus may importance sample the product of the two. However, these conventional techniques suffer from various limitations; for example, there is no efficient way to rotate a Haar wavelet representation. Embodiments may directly use the analytic conversion method in this case. One of the two functions, for example a reflectance function, may be represented in the spherical harmonic domain. The analytic conversion method may be applied to perform a fast conversion of the function into the Haar wavelet domain, and an importance sampling technique may then be applied which samples the product of the two functions in the Haar wavelet domain.

Figure 3B:
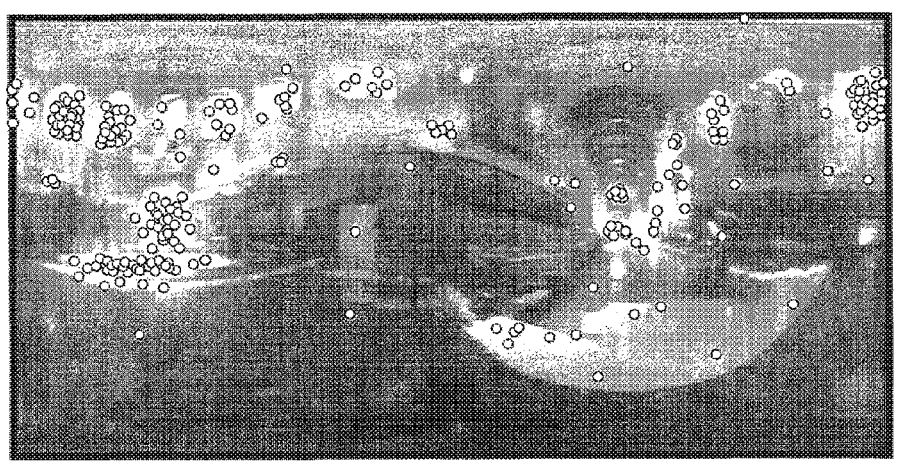
Figure 3C:

FIGS. 3A through 3C graphically illustrate aspects of importance sampling according to embodiments. Note that the white or gray dots on the images represent sample points. Embodiments provide a method for importance sampling spherical harmonic functions such as the bidirectional reflectance distribution function (BRDF) illustrated in FIG. 3A. FIG. 3B illustrates Haar wavelet importance sampling on an environment map. Embodiments may also be combined with wavelets to importance sample the product of a spherical harmonic function and a Haar wavelet function, as illustrated in FIG. 3C.

Conventional Sampling Techniques

The following briefly summarizes some conventional sampling techniques, focusing on importance sampling in the context of rendering, and contrasts the conventional techniques with embodiments as described herein.

Bidirectional Reflectance Distribution Function (BRDF) Sampling

A commonly used conventional technique for increasing the efficiency of ray tracing based algorithms is to importance sample the reflected rays based on the scattering function. Several BRDF models can be directly importance sampled, including the Phong model, the Ward model, the Lafortune model, and many others. Complex BRDF models such as the Torrance-Sparrow and Cook-Torrance models cannot be analytically inverted and require numerical approximations. However, parametric models which are directly invertible, such as the Ward, Lafortune, and halfway vector disk BRDFs have been successfully used to approximate complex measured BRDF data. Several researchers have addressed the problem of importance sampling measured BRDFs. Though spherical harmonics can be used to efficiently represent low frequency BRDFs and indirect lighting, no conventional BRDF sampling techniques have considered spherical harmonics since practical importance sampling techniques have not existed for this basis.

In radiative transfer within participating media, phase functions are generally smooth and commonly represented using spherical or zonal harmonics. Unfortunately, since spherical harmonics do not support importance sampling, most techniques rely on simpler, analytically invertible, models such as the Henyey-Greenstein and Schlick phase functions. Multi-lobe variants of these phase functions allow for very complex scattering distributions; however, though these phase functions can also be sampled, the required splitting process destroys stratification and the resulting distributions are of low quality.

Embodiments of the spherical harmonic importance sampling method may, for example, be used on arbitrarily complex distributions, and may preserve the variance reduction properties of stratification. Furthermore, embodiments are particularly well suited for phase functions, since the spherical harmonic importance sampling method gains further efficiency when using only the zonal subset of spherical harmonics.

Environment Map Sampling

Several conventional techniques have been developed for sampling complex distant lighting by placing pre-integrated direction lights at the brightest locations in environment maps. These methods may work well within diffuse scenes but become increasingly inefficient on glossy and specular (mirror-like) surfaces. This issue has been addressed by using spherical harmonics to pre-filter the environment map according to the BRDF. However, since efficient sampling techniques have not been available for spherical harmonics, these methods could not account for occlusions from other objects.

Embodiments of the spherical harmonic importance sampling method directly address this limitation of spherical harmonics.

Product Sampling

Conventional approaches have also been developed which attempt to use information about both the BRDF and the lighting in the sampling process. For example, multiple importance sampling can be used to optimally combine several sampling strategies. Approaches have been developed which try to distribute samples according to the product of the lighting and the BRDF. The simplest techniques first draw samples according to one of the terms and then adjust these samples to match the product distribution.

This can be done using importance resampling, or by rejection sampling; however, these become ineffective if both functions have high peaks. Furthermore, none of these techniques can preserve stratification.

A wavelet importance sampling approach has been developed which can directly generate samples according to the product of two or more functions. This approach employs a sampling procedure that hierarchically warps a uniform input point set to match the wavelet product. Since warping is performed hierarchically and in small increments, stratification properties of the input set are preserved in the output distribution. Unfortunately, since the two functions need to lie in the same coordinate system and no efficient rotation exists for Haar wavelets, expensive pre-rotation is necessary. Due to memory constraints, this limits the method to relatively low-resolution lighting, and still may require hours of precomputation. Recent work has tried to address this limitation by either heuristically splitting the environment map based on peaks in the BRDF or by constructing a wavelet approximation of the BRDF on-the-fly.

Embodiments of the spherical harmonic importance sampling method rely on a sample warping procedure to efficiently produce high quality distributions for spherical harmonics. Embodiments may also be applied to product sampling, and address the limitations of wavelet importance sampling by relying on efficient rotations in the spherical harmonic domain. Thus, embodiments may seamlessly combine and exploit the complementary properties of spherical harmonics and Haar wavelets.

An algorithm for importance sampling the product of distant environment map lighting with an orientable clamped-cosine lobe has been developed. This algorithm creates a triangulated representation of the environment map and stores the illumination premultiplied by each of the first nine spherical harmonic basis functions at every vertex. This forms a steerable basis where the clamped-cosine can be efficiently rotated to any orientation. Sampling this triangulation is done using an approach much like a hierarchical sample warping technique.

Embodiments of the spherical harmonic importance sampling method have several advantages when compared to the above-described algorithm. For example, the algorithm for importance sampling the product of distant environment map lighting with an orientable clamped-cosine lobe only considers a circularly symmetric cosine lobe, which is approximated using order 3 spherical harmonics. In contrast, embodiments of the spherical harmonic importance sampling method work for arbitrary spherical harmonic functions of any order. Though generalizing the other approach to higher orders is possible, since a full 2D environment triangulation must be stored for each additional spherical harmonic basis, memory usage becomes an issue. In contrast, embodiments of the spherical harmonic importance sampling method require no additional storage if importance sampling a single spherical harmonic function, and only utilize a 1D mip map per spherical harmonic basis for product sampling. Furthermore, embodiments of the spherical harmonic importance sampling method can exploit the fast wavelet product to multiply two functions on-the-fly, while the conventional method requires a fixed, premultiplied environment map.

Basis Representations—Spherical Harmonics and Haar Wavelets

Embodiments of the spherical harmonic importance sampling method may rely on both spherical harmonics and hierarchical sample warping for Haar wavelets. Therefore, a brief introduction to these two basis representations is provided in this section. In subsequent sections, an embodiment of the spherical harmonic importance sampling method that leverages both spherical harmonics and hierarchical sample warping is described, and the description thereof builds upon and refers to portions of the discussion in this section.

Spherical Harmonics

Spherical harmonics are a frequency-space basis for representing functions defined over the sphere. If a direction vector $\vec{\omega}$ is represented using the standard spherical parameterization, $$\vec{\omega} = (x, y, x) = (\sin\theta\cos\phi, \sin\theta\sin\phi, \cos\theta)$$

then the real-valued spherical harmonic basis functions are defined as:

$$y_l^m(\theta, \phi) = \begin{cases} K_l^m P_l^{|m|}(\cos\theta)\cos(|m|\phi) & \text{if } m \geq 0, \\ K_l^m P_l^{|m|}(\cos\theta)\sin(|m|\phi) & \text{if } m < 0, \end{cases} \quad (1)$$

where $P_l^m$ are the associated Legendre polynomials and $K_l^m$ are normalization constants. In one embodiment, the Condon-Shortley phase factor of $(-1)^m$, which is sometimes included in the definition of $P_l^m$ or $y_l^m$, is omitted, since this simplifies the notation. Some sources include this factor, while others do not, so care should be taken in determining the convention used when referencing the literature.

Figure 4:
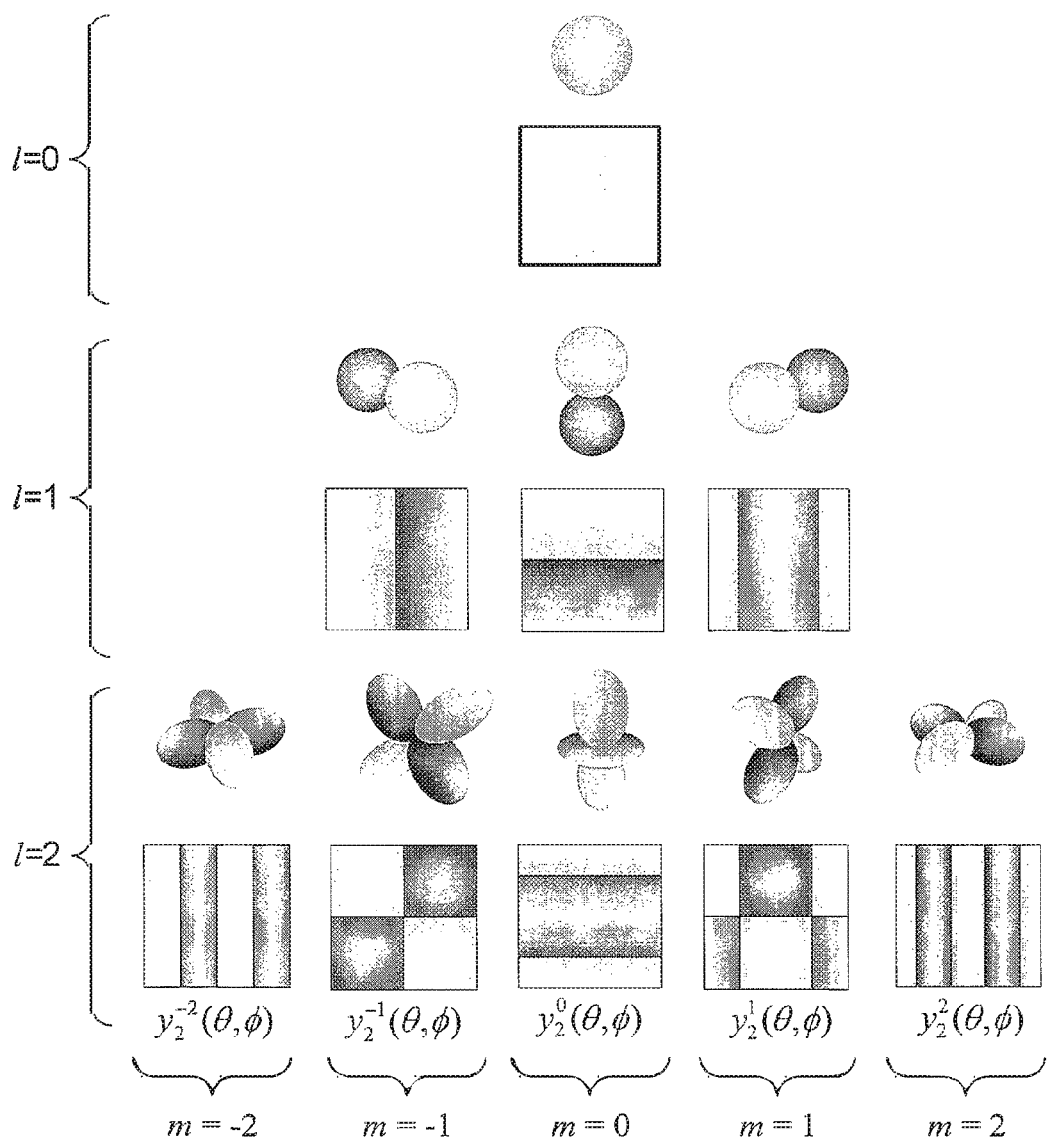
FIG. 4 illustrates visualizations of the first nine spherical harmonic basis functions in Cartesian and spherical coordinates.

The basis functions are indexed according to two integer constants, the order or band, l, and the degree, m. These satisfy the constraints that l is a nonnegative integer, $l \in Z^*$, and $-l \leq m \leq l$. Therefore, $2l+1$ basis functions exist at order l and $n^2$ total basis functions occupy the first n bands, $l = 0 \ldots (n-1)$. The basis functions can be visually arranged into a pyramid of increasing order, as shown in FIG. 4. FIG. 4 illustrates visualizations of the first nine spherical harmonic basis functions in Cartesian and spherical coordinates, where the lighter shading indicates positive values and the darker shading indicates negative values. It may be convenient to reformulate the indexing scheme to use a single parameter:

$$i = l(l+1) + m,$$

which flattens the pyramid using a level-order traversal.

Orthogonality and Normalization.

The spherical harmonics are orthonormal, satisfying the condition:

$$\langle y_i, y_j \rangle = \int_{\Omega_{4\pi}} y_i(\vec{\omega}) y_j(\vec{\omega}) d\vec{\omega} = \delta_{i,j} \quad (2)$$

where $\delta_{i,j}$ denotes the Kronecker delta function. The normalization constant that satisfies this condition is:

$$K_l^m = \sqrt{\frac{(2 - \delta_{0m})(2l+1)}{4\pi} \frac{(l - |m|)!}{(l + |m|)!}}. \quad (3)$$

Note that other normalizations are possible and may be used, but orthonormality is used because of its convenience in this context.

Projection and Reconstruction.

The spherical harmonic functions define a complete basis over the sphere. Thus, any real-valued spherical square-integrable function $f$ may be represented exactly as a linear combination of the infinite set of basis functions. By limiting the number of bands to a finite l=n−1, an nth order, band-limited approximation $\tilde{f}$ of the original function $f$ may be obtained as:

$$f(\vec{\omega}) \approx \tilde{f}(\vec{\omega}) = \sum_{l=0}^{n-1} \sum_{m=-l}^{l} y_l^m(\vec{\omega}) f_l^m. \qquad (4)$$

where the coefficients $f_l^m$ are computed by projecting $f$ onto each basis function $y_l^m$. Low-frequency functions can be well approximated using only a few bands, and as the number of coefficients increases, higher frequency signals can be approximated more accurately. Because the spherical harmonic basis is orthonormal, the projection coefficients that minimizes least-squares error can be computed by simply integrating the original function against each basis function:

$$f_l^m = \int_{\Omega_{4\pi}} y_l^m(\vec{\omega}) f(\vec{\omega}) d\vec{\omega} \qquad (5)$$

Other Properties and Operations of Spherical Harmonics

Spherical harmonics have other useful properties such as, for instance, rotation invariance, which guarantees alias-free projections. These properties lead to a number of efficient operations for computing rotations, convolutions, and double product integrals, all in the spherical harmonic domain. These properties of spherical harmonics are summarized in the table illustrated in FIG. 2.

Limitations of Spherical Harmonics

Spherical harmonics are a natural basis for many problems in computer graphics due to the prevalence of graphics problems posed in the spherical or hemispherical domain. However, conventionally, spherical harmonics do not support an effective importance sampling procedure.

Hierarchical Sample Warping for Haar wavelets

Figure 5:
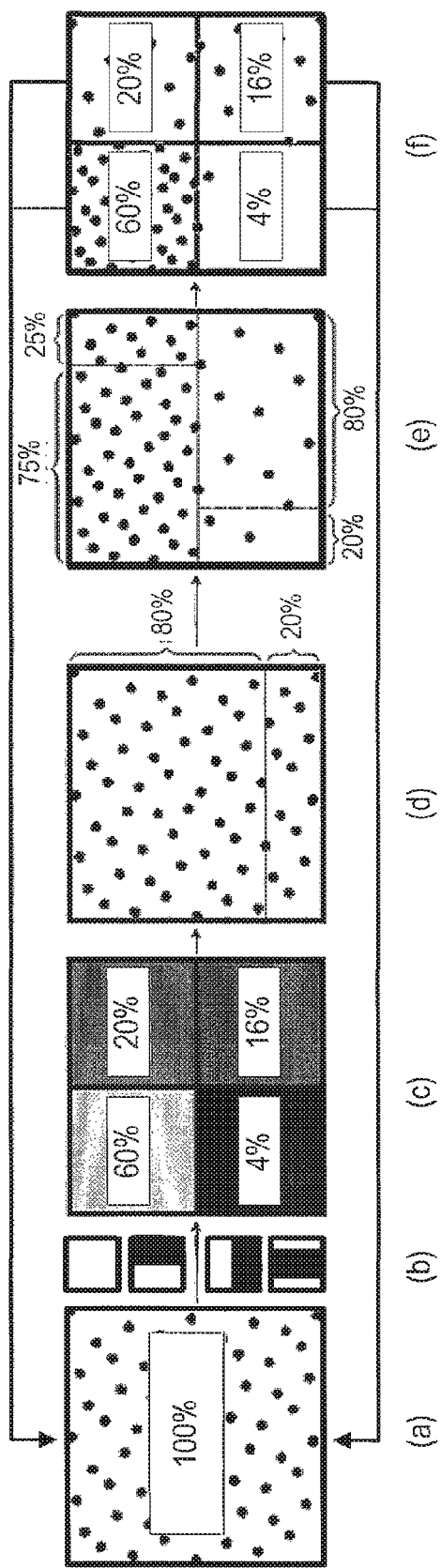
FIG. 5 illustrates a hierarchical sample warping method according to one embodiment.
Figure 6:
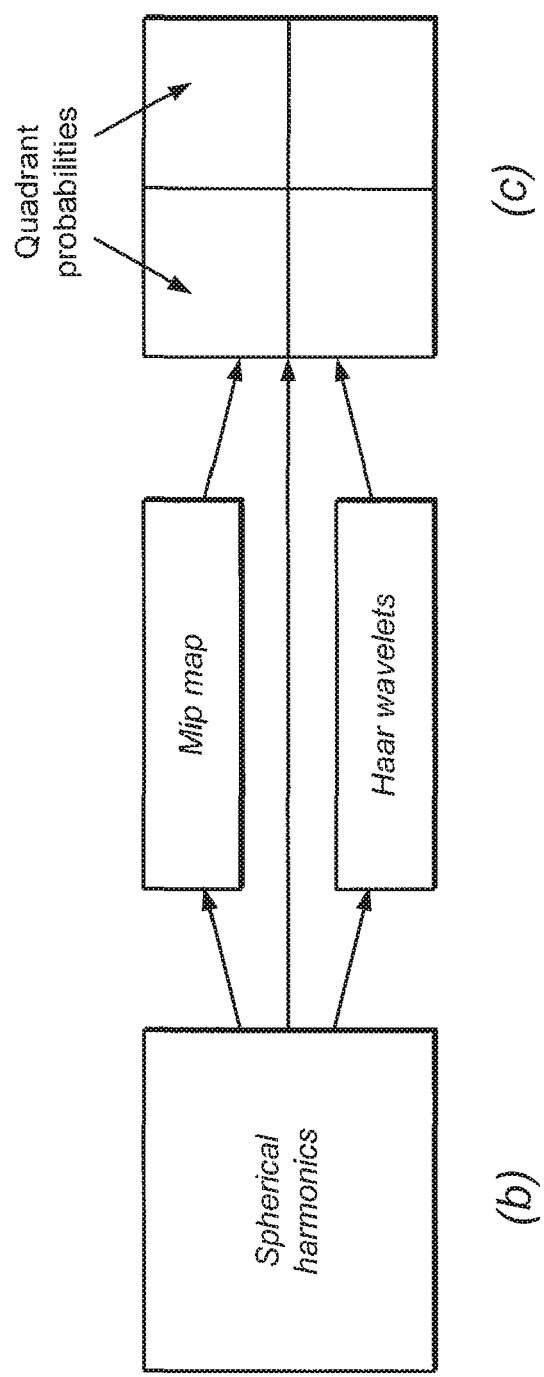
FIG. 6 illustrates a transition between (b) and (c) of FIG. 5 according to one embodiment.

In 2D, both mip maps and Haar wavelets can be seen as a quad-tree hierarchy of coefficients. In a mip map, each tree node (past the root) points to four children and contains exactly four scaling coefficients, while in a Haar wavelet each node points to four children but contains at most three wavelet coefficients. If either type of tree is traversed in top-down order, at each node it is possible to extract the average value within the four child regions. This observation leads to an efficient hierarchical sample warping scheme that warps an initially uniform set of points by first computing the marginal probability of intensity in the top and bottom half of the node. The input point set is split according to this ratio and scaled to fit within the two halves. This process is repeated independently on each of the two rows, and the whole process repeats hierarchically on the four children. It is easy to generalize this procedure to mip maps or wavelets in any dimension. This process is illustrated in FIGS. 5 and 6. For simplicity, the mip map basis will be used in subsequent discussion, but a Haar basis could easily be used instead.

FIG. 5 illustrates a hierarchical sample warping method according to one embodiment. To perform hierarchical sample warping, the method starts with a uniform set of points (a) and integrates the spherical harmonic basis functions (b) to obtain the quadrant probabilities (c). The point set is first partitioned vertically according to the marginal row probabilities (d), and then each row is divided horizontally according to the probabilities of its cells (e). The whole process repeats on the four quadrants recursively.

FIG. 6 illustrates a transition between (b) and (c) of FIG. 5 according to one embodiment. The spherical harmonic basis functions (b) are converted into mip map or Haar wavelet representation, as described elsewhere herein (see, e.g., equations 6 and 10) to obtain the quadrant probabilities (c).

Spherical Harmonic Importance Sampling Method

An insight behind the spherical harmonic importance sampling method as described herein is that hierarchical sample warping can be applied to spherical harmonics as long as there is a suitable mapping onto the sphere and as long as the average value of the spherical harmonic function can be computed at each level in the traversal. The second observation, which makes this idea practical, recognizes that since any spherical harmonic function $\tilde{f}$ is a weighted sum of basis functions $y_l^m$, the integral of $\tilde{f}$ over any region $\Omega_R$ is simply the weighted sum of basis function integrals:

$$\int_{\Omega_R} \tilde{f}(\vec{\omega}) d\vec{\omega} = \qquad (6)$$

$$\int_{\Omega_R} \left( \sum_{l=0}^{n-1} \sum_{m=-l}^{l} f_l^m y_l^m(\vec{\omega}) \right) d\vec{\omega} = \sum_{l=0}^{n-1} \sum_{m=-l}^{l} f_l^m \underbrace{\int_{\Omega_R} y_l^m(\vec{\omega}) d\vec{\omega}}_{\hat{y}_l^m}$$

Equation 6 says that if there is access to a collection of preintegrated basis functions $\hat{y}_l^m$, then hierarchical sample warping may be applied to any arbitrary spherical harmonic function by performing a weighted sum with its projection coefficients. A naive application of this concept could be to create a 2D mip map or Haar wavelet representation of each basis function in a pre-process and then perform a weighted sum of these hierarchical representations on-the-fly to perform warping. This naive approach works, but embodiments may do significantly better by exploiting the structure of the basis functions.

Computing Basis Function Integrals

If a standard spherical mapping is used, the average value over a mip map node is proportional to the following integral in spherical coordinates:

$$\hat{y}_l^m = \iint y_l^m(\theta,\phi) \sin \theta d\theta d\phi, \qquad (7)$$

This expression can be simplified by observing that the spherical harmonic basis functions are separable. This can be expressed as:

$$y_l^m(\theta,\phi) = K_l^m P_l^{|m|}(\cos \theta) \Phi^m(\phi), \qquad (8)$$

where:

$$\Phi^m(\phi) = \begin{cases} \cos(m\phi) & \text{if } m \geq 0 \\ \sin(|m|\phi) & \text{if } m < 0 \end{cases} \qquad (9)$$

and is illustrated in FIG. 7. FIG. 7 illustrates the separation of spherical harmonic basis functions. In FIG. 7, the spherical harmonics (top) are separable into a θ-dependent component (middle) and a φ-dependent component (bottom). Therefore, it is possible to transform the two-dimensional integral in equation (7) into two one-dimensional integrals:

$$\hat{y}_l^m = \iint K_l^m P_l^{|m|}(\cos \theta) \Phi^m(\phi) \sin \theta d\theta d\phi = K_l^m (\int P_l^{|m|}(\cos \theta) \sin \theta d\theta)(\int \Phi^m(\phi) d\phi) \qquad (10)$$

The first term is simply the normalization constant defined in equation 3. The following subsections describe methods for computing the two integrals according to some embodiments.

Integrals of Associated Legendre Functions

The middle term in equation 10 involves computing the integral of an expression containing two trigonometric functions and an associated Legendre function. Solving this integral directly is difficult. However, the problem can be simplified by performing a change of variables to cylindrical coordinates and observing that, $$\int_{\theta_-}^{\theta_+} P_l^{|m|}(\cos\theta)\sin\theta d\theta = \int_{z_-}^{z_+} P_l^{|m|}(z)dz = \hat{P}_l^{|m|}, \quad (11)$$

where:
z = cos θ
z_ = cos(θ_),
z_+ = cos(θ_+).

Therefore, a method is needed to compute the integral of the associated Legendre functions, $\hat{P}_l^{|m|}$.

Since associated Legendre functions are just polynomials in z, the functions could be symbolically integrated using a computer algebra system, such as the Maple™ computer algebra system or the MATLAB® computer algebra system, and the functions could thus be hard-coded up to a sufficiently large order. Maple™ is a trademark of Waterloo Maple, Inc. MATLAB® is a trademark of The MathWorks, Inc. A similar approach has been taken for integrating the spherical harmonics over a spherical triangle.

Though this approach may be exact, and may be used in some embodiments, it has drawbacks. Firstly, a set of hard-coded functions requires a predetermined maximum number of bands in the spherical harmonic approximation. This may be sufficient for some applications, but reduces the generality of the approach. More importantly, in embodiments, when evaluating the integral of a spherical harmonic function using equation 6, it may be necessary to compute the integrals of all basis functions up to some band n, which would be very inefficient with this approach.

A more efficient approach that may be used in some embodiments is to derive recurrence relations that compute the integral $\hat{P}_l^{|m|}$ directly from the integrals at lower values of l and m. Two such methods have been independently developed in the geodesy field. One of these approaches is more efficient and compact, and thus some embodiments may use this approach, although the other approach may also be used. The approach used involves two recurrence relations. The first is a recurrence on l:

$$\hat{P}_l^m = \frac{(l-2)(l-1+m)}{(l+1)(l-m)}\hat{P}_{l-2}^m - \frac{2l-1}{(l+1)(l-m)}(1-z^2)P_{l-1}^m(z)\Big|_{z_-}^{z_+}, \quad (12)$$

which is valid for 0≤m<l. When m=l−1, the first term above drops out since $\hat{P}_{l-2}^{l-1}$ is implicitly zero. This relation has a singularity when m=l, so a second recurrence may be used for this case:

$$\hat{P}_l^l = \frac{1}{l+1}\left[l(2l-3)(2l-1)\hat{P}_{l-2}^{l-2} + zP_l^l(z)\Big|_{z_-}^{z_+}\right]. \quad (13)$$

To start the recurrence, the following may be used in some embodiments:

$$\hat{P}_0^0 = z_+ - z_-, \quad (14)$$

$$\hat{P}_1^0 = \frac{z_+^2 - z_-^2}{2}, \quad (15)$$

$$\hat{P}_1^1 = \frac{1}{2}\left[z\sqrt{1-z^2} + \sin^{-1}(z)\right]\Big|_{z_-}^{z_+}. \quad (16)$$

These two recurrence relations are numerically robust and allow embodiments to compute all the integrals up to order n in $O(n^2)$ time (note that this is actually linear time since there are $n^2$ basis functions up to order n). In contrast, symbolic evaluation would require $O(n^4)$ time and can suffer from catastrophic floating-point cancellation when implemented naïvely. An example of pseudo-code for this recurrence procedure is provided in Algorithm 1, shown in FIG. 8.

Integral Along Polar Direction

The last term in equation 10 is trivial to compute since it is the integral of a trigonometric function:

$$\hat{\Phi}^m(\phi) = \int \Phi^m(\phi)d\phi = \frac{1}{m}\begin{cases} \sin(m\phi) & \text{if } m \geq 0, \\ \cos(m\phi) & \text{if } m < 0. \end{cases} \quad (17)$$

This can be evaluated directly; however, to compute integrals for all basis functions up to some band in, this requires O(n) calls to expensive transcendental functions. This may be made more efficient by using the following multiple-angle recurrence relations:

$$\sin(m\phi) = 2\sin((m-1)\phi)\cos(\phi) - \sin((m-2)\phi) \quad (18)$$

$$\cos(m\phi) = 2\cos((m-1)\phi)\cos(\phi) - \cos((m-2)\phi). \quad (19)$$

This recurrence can be initialized with:
m=0: cos(0)=1, sin(0)=0,
m=1: cos(φ)=cos(φ), sin(φ)=sin(φ),
which requires only a single evaluation of the two trigonometric functions for any value of n. An example of pseudo-code for this recurrence method is provided in Algorithm 2, shown in FIG. 9.

Spherical Harmonic Importance Sampling

In embodiments, the concepts and results from the previous section may be applied into a practical approach for importance sampling spherical harmonics. In embodiments, standard cylindrical coordinates may be used to map the 2D mip map or Haar wavelets onto the spherical domain. Spherical coordinates may also be used in embodiments, but cylindrical coordinates are area-preserving, which simplifies the procedure. Given this mapping, hierarchical warping may need to evaluate equation 6 over the area of each node in the traversal. An embodiment may therefore need to compute the integral, $\hat{y}_l^m$, of the spherical harmonic basis functions, which, in cylindrical coordinates, becomes:

$$\hat{y}_l^m = K_l^m\left(\int_{z_-}^{z_+} P_l^{|m|}(z)dz\right)\left(\int_{\phi_-}^{\phi_+} \Phi^m(\phi)d\phi\right). \quad (20)$$

These two integrals can be efficiently evaluated for all values of l and m, for example using example algorithm 1 and example algorithm 2 illustrated in FIG. 8 and FIG. 9, respectively.

To perform warping, an embodiment may start at the root and evaluate the definite integrals of all basis functions, $\hat{y}_l^m$, over the four quadrants of the sphere. The weighted sum of these integrals according to equation 6 gives the exact integral of the spherical harmonic function for the four quadrants. An embodiment may warp the points according to this 2×2 importance function, and repeat hierarchically for each of the four child nodes. At each stage of warping, an embodiment may evaluate equation 20 with integration bounds defined by the extents of the four child nodes. At the end of the procedure the points may be distributed with a probability density function (PDF) proportional to the spherical harmonic function. In one embodiment, the PDF of each sample is simply the integral of the containing node divided by the integral of the whole function.

Probability Density Function (PDF)

In embodiments, a probability density function (PDF) may be used for sampling the integrand. Rather than sampling the integrand uniformly in an unbiased manner, embodiments may purposely sample the integrand more in regions that will have more impact on the result of the integral. To remove bias, embodiments may re-weight the samples that have been taken, since more samples are placed in some areas than in others.

Suppose the following 1D integral is to be sampled:

$$F = \int_a^b f(x)dx$$

n samples can be uniformly generated to get an approximate value:

$$F_{approx} = \frac{b-c}{n} * \sum_1^n f(x)$$

If there is a probability density function (PDF) and samples are drawn non-uniformly from some distribution, then:

$$F_{approx} = \frac{1}{n} * \sum_1^n \left(\frac{f(x)}{p(x)}\right)$$

The PDF here is given by p(x). Non-uniform sampling may yield faster convergence when a good PDF is found.

Using 1D Mip Maps

Embodiments of the warping technique described above require no precomputation and may have infinite precision, since an embodiment can continue warping to an arbitrary depth. However, infinite precision may not be necessary, especially for low-order spherical harmonic functions that vary smoothly. To improve performance, a cylindrical mip map representation of all the needed basis functions may be computed, and then warping may be performed on the weighted sum of these mip maps. However, equations 10 and 20 show that, due to separability, the 2D integral of the spherical harmonic bases may be computed by only performing two 1D integrals. Thus, embodiments may implicitly construct each of these 2D mip maps by storing only two 1D mip maps. This significantly reduces memory requirements and also improves performance due to better cache coherence. This leads to embodiments that implement an efficient importance sampling scheme for spherical harmonics which only requires $2n^2$ 1D mip maps for order n spherical harmonic functions. Note that these mip maps need to be created only once, since they are not function-dependent and can be used for any spherical harmonic function by weighting using a different set of coefficients $f_l^m$.

Product Sampling

There are techniques to directly importance sample the product of two functions stored as Haar wavelets by exploiting a fast wavelet product. Embodiments of the spherical harmonic sampling method described herein may implicitly create a mip map or Haar wavelet representation of the function. Embodiments can therefore be used to exploit the fast wavelet product to importance sample the product of a spherical harmonic function and a mip map or Haar wavelet on-the-fly. Thus, embodiments may bridge the gap between the spherical harmonic and Haar wavelet bases, allowing embodiments to use spherical harmonics for smooth functions such as BRDFs and Haar wavelets for high-frequency environment maps. Furthermore, the spherical harmonic function can be efficiently rotated in embodiments, thus allowing embodiments to use a local coordinate system and a single, high-resolution environment map.

Flowcharts

Figure 10A:
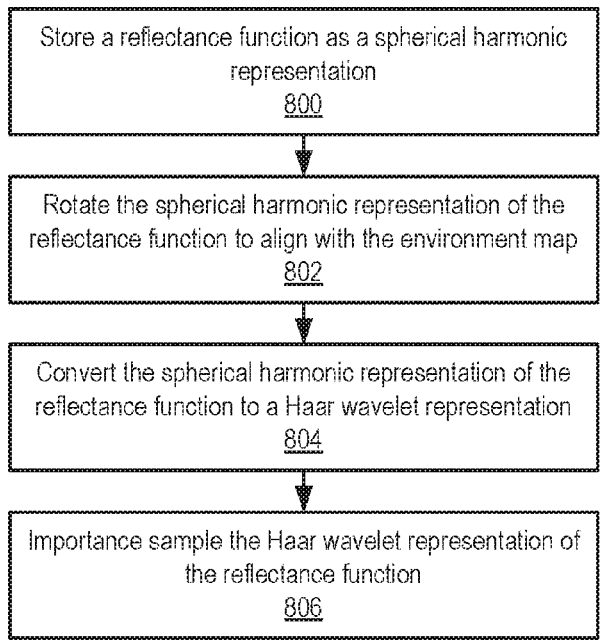
FIGS. 10A and 10B are flowcharts of methods in importance sampling spherical harmonics according to embodiments.
Figure 10B:
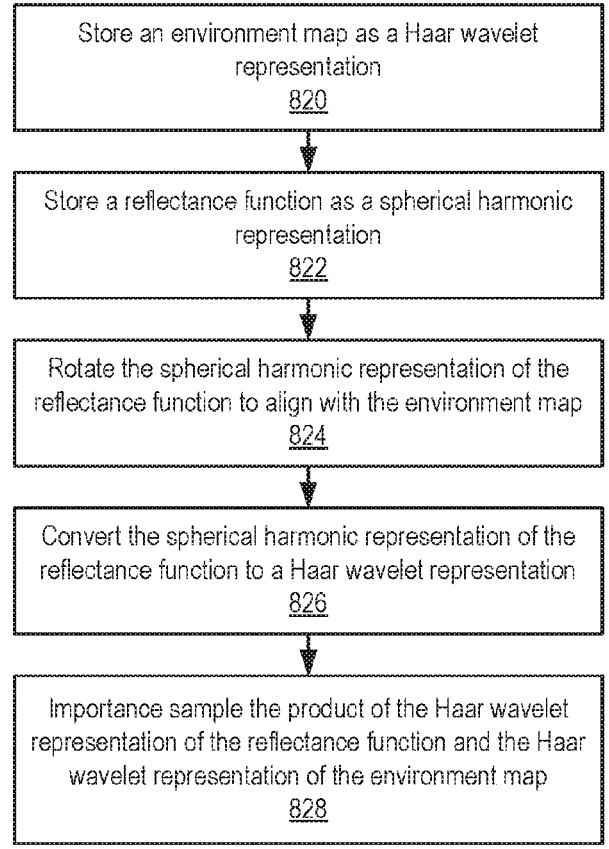

FIGS. 10A and 10B are flowcharts of methods in importance sampling spherical harmonics according to embodiments. FIG. 10A is a flowchart of a method of performing rotation and importance sampling according to one embodiment. As indicated at 800, a reflectance function may be stored as a spherical harmonic representation, for example as a BRDF. As indicated at 802, the spherical harmonic representation of the reflectance function may be rotated to align with an environment map. The environment map may be stored as a Haar wavelet representation. As indicated at 804, the spherical harmonic representation of the reflectance function may be converted to a Haar wavelet representation using an efficient algorithmic conversion method as described elsewhere herein. As indicated at 806, the Haar wavelet representation of the reflectance function can then be importance sampled.

FIG. 10B is a flowchart of a method of importance sampling the product of two functions according to one embodiment. As indicated at 820, an environment map may be stored as a Haar wavelet representation. As indicated at 822, a corresponding reflectance function may be stored as a spherical harmonic representation, for example as a BRDF. As indicated at 824, the spherical harmonic representation of the reflectance function may be rotated to align with an environment map. As indicated at 826, the spherical harmonic representation of the reflectance function may be converted to a Haar wavelet representation using an efficient algorithmic conversion method as described elsewhere herein. As indicated at 828, the product of the Haar wavelet representation of the reflectance function and the Haar wavelet representation of the environment map may be generated, and the product may be importance sampled.

Example Applications and Implementations of Embodiments

An example of an application of embodiments is in computer graphics, for example in 3-D rendering of synthetic scenes, or photorealistic rendering. In this application, there is generally an environment map, and a set of one or more reflectance functions defined on objects in a scene. A 3-D rendering process is used to compute a high-quality, illuminated result or results from the environment map and reflectance function(s). Embodiments may enable a 3-D rendering process to more quickly and efficiently generate quality results, i.e. output images, than could be done using conventional techniques. Embodiments may be applied to other areas or problems in computer graphics, such as artificial stippling, and procedural geometry placement, and may also be extended into areas outside of computer graphics.

Embodiments may be implemented as a stand-alone program, a module or plug-in, a library function, or generally as any sort of software entity. For simplicity, an implementation of an embodiment of the method described herein may be referred to as a function representation conversion module.

Figure 11:
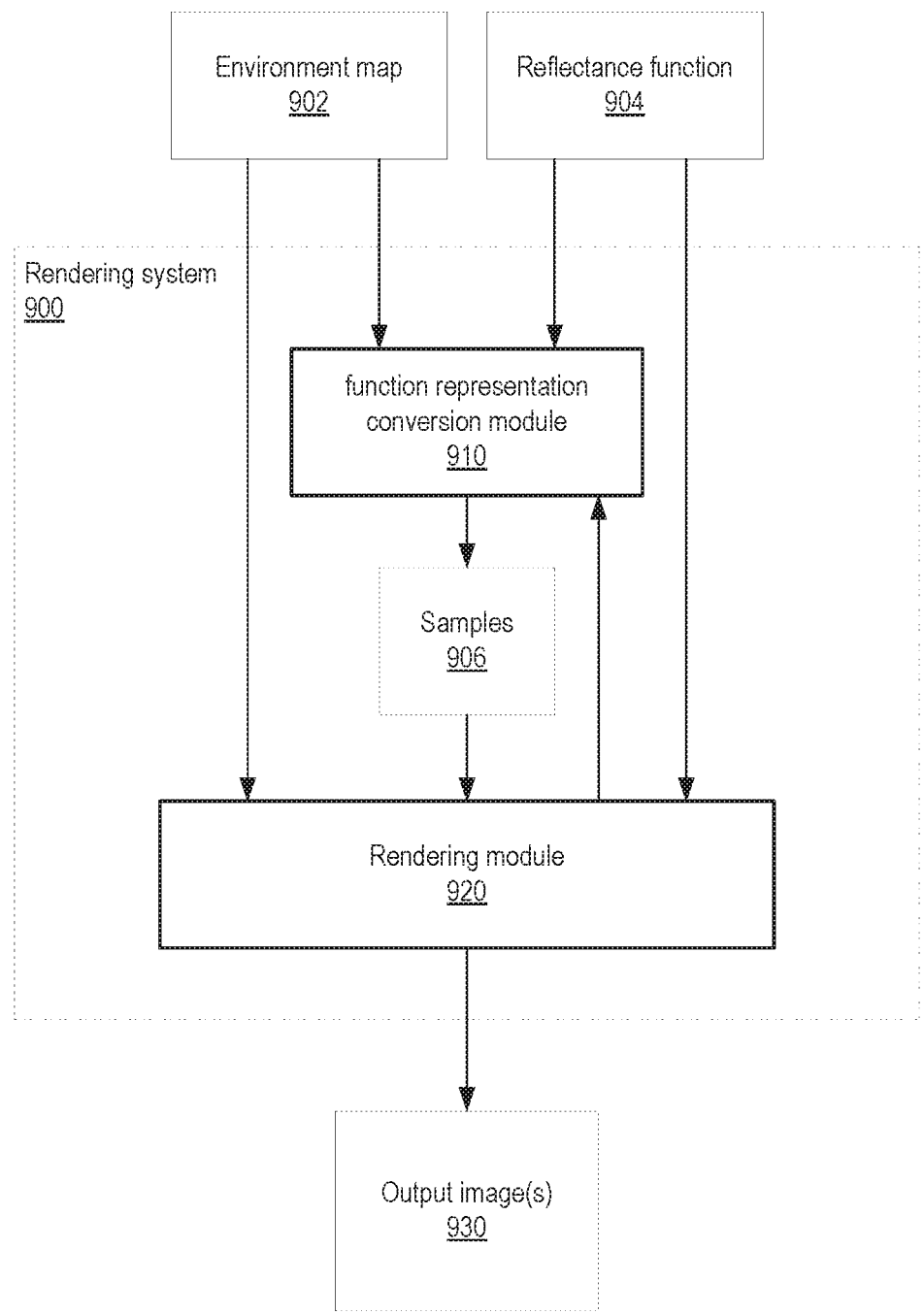
FIG. 11 illustrates a function representation conversion module in a rendering system according to one embodiment.
Figure 12:
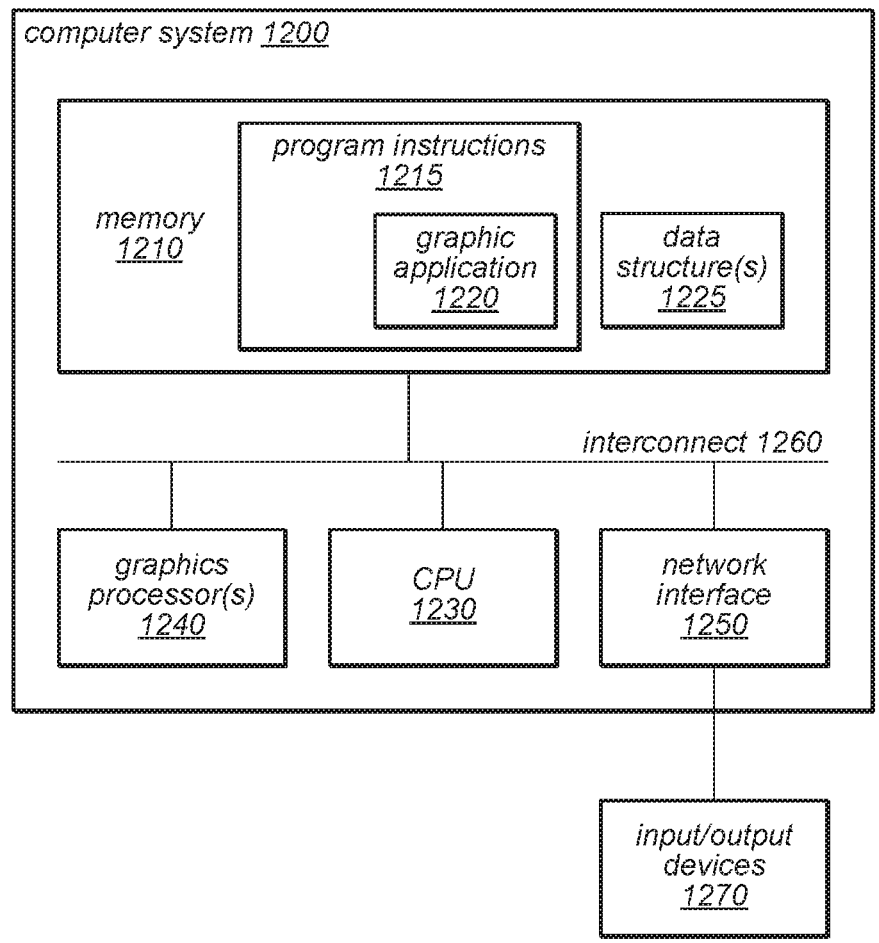
FIG. 12 illustrates an example of a computer system that may be used in embodiments.

FIG. 11 illustrates a function representation conversion module performing importance sampling in a rendering system according to one embodiment. The function representation conversion module 910 may be implemented in, called by, or plugged into a rendering system 900 that traces rays via a ray tracing function and performs other rendering tasks to render an output synthetic image or images from environment map(s) and reflectance function(s) of surfaces. FIG. 12 illustrates an example of a system in which a rendering system 900 may be implemented, e.g. as or in graphic application 1220. Returning again to FIG. 11, in an application for 3-D rendering of synthetic scenes, function representation conversion module 910 may receive, as input, lighting (e.g., environment map 902) and reflectance (e.g., reflectance function 904, for example a BRDF). Environment map 902 may, for example, be stored as a Haar wavelet representation, and reflectance 904 may be stored as a spherical harmonic representation. Function representation conversion module 910 may generate samples 906 according to the methods described herein. Samples 906, in this example, represent directions over a sphere, hemisphere, or other shape that indicate where rays are to be traced. The output from the function representation conversion module 910 may be provided to a rendering module 920 that performs the ray tracing, and so on, for use in rendering an output image or images 930. Output image(s) 930 may be stored to a storage device, transmitted over a network, printed, or otherwise used in a computer graphics application. The rendering system 900 may use the function representation conversion module 910 to perform rotations, to perform importance sampling of a reflectance function stored as a spherical harmonic representation, and to perform importance sampling of the product of the reflectance function and the environment map. In so doing, function representation conversion module 910 may convert a function from one representation (spherical harmonics) into another representation (e.g., Haar wavelets or mip map). Rotations may be performed using a spherical harmonic representation, and importance sampling may be performed using a Haar wavelet representation.

Example System

The methods described herein including those for converting spherical harmonics representations of functions to multi-resolution representations may be implemented, for example as a function representation conversion module 910 as illustrated in FIG. 11, by a computer system configured to provide the functionality described. FIG. 12 is a block diagram illustrating one embodiment of a computer system 1200 suitable for implementing embodiments of a function representation conversion module 910. A graphics application such as graphics application 1220 may be configured to perform various image processing functions and to render new images accordingly. In some embodiments, a user may invoke operations to perform various functions as described for embodiments via a user interface of graphics application 1220. Graphics application 1220 may be configured to perform these operations using the methods described herein for importance sampling spherical harmonics. Graphics application 1220 may, for example, be configured to render an output synthetic image using embodiments of a function representation conversion module 910 to generate samples 906.

Graphics application 1220 may represent various types of graphics applications, such as painting, publishing, photography, games, animation, and other applications. Additionally, graphics application 1220 may utilize a graphics processor 1240 when rendering or displaying images according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 1240 may implement a number of graphics primitive operations in a way that makes executing them much faster than drawing directly to the screen with a host central processing unit (CPU), such as CPU 1230. In various embodiments, the methods disclosed herein for may be implemented by program instructions configured for parallel execution on two or more such GPUs. The GPU 1200 may implement one or more application programmer interfaces (APIs) that permit programmers to invoke the functionality of the GPU. Suitable GPUs may be commercially available from vendors such as NVIDIA Corporation, ATI Technologies, and others.

Please note that functionality and/or features described herein as being part of, or performed by, graphics application 1220 may, in some embodiments, be part of, or performed by, one or more graphics processors, such as graphics processor 1240. As described above, in some embodiments graphics application 1220 may be configured to render modified and/or reconstructed images into a different window than input images.

The various functions described herein for embodiments of a function representation conversion module may be implemented on various types of computer systems. Referring again to FIG. 12, computer system 1200 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Graphics application 1220, which may be configured to implement a function representation conversion module 910 as described herein, may be provided as a computer program product, or software, that may include a computer-readable storage medium having stored thereon instructions, which may be used to program a computer system (or other electronic devices) to implement computer graphics functions such as rendering synthetic images using the techniques described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

As illustrated in FIG. 12, computer system 1200 may include one or more processor units (CPUs) 1230. Processors 1230 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Any desired operating system(s) may be run on computer system 1200, such as various versions of Unix, Linux, Windows™ from Microsoft Corporation, MacOS™ from Apple Corporation, or any other operating system that enables the operation of software on a hardware platform.

The computer system 1200 may also include one or more system memories 1210 (e.g., one or more of cache, SRAM, DRAM, RDRAM, EDO RAM, DDR RAM, SDRAM, Rambus RAM, EEPROM, or other memory type), or other types of RAM or ROM) coupled to other components of computer system 1200 via interconnect 1260. Memory 1210 may include other types of memory as well, or combinations thereof. One or more of memories 1210 may include program instructions 1215 executable by one or more of processors 1230 to implement a function representation conversion module 910 as described herein. Program instructions 1215, which may include program instructions configured to implement graphics application 1220, may be partly or fully resident within the memory 1210 of computer system 1200 at any point in time. Alternatively, program instructions 1215 may be provided to GPU 1240 for performing various computer graphics operations (or portions thereof) on GPU 1240 using one or more of the techniques described herein. In some embodiments, the techniques described herein may be implemented by a combination of program instructions 1215 executed on one or more processors 1230 and one or more GPUs 1240, respectively. Program instructions 1215 may also be stored on an external storage device (not shown) accessible by the processor(s) 1230 and/or GPU 1240, in some embodiments. Any of a variety of such storage devices may be used to store the program instructions 1215 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 1230 and/or GPU 1240 through one or more storage or I/O interfaces including, but not limited to, interconnect 1260 or network interface 1250, as described herein. In some embodiments, the program instructions 1215 may be provided to the computer system 1200 via any suitable computer-readable storage medium including memory 1210 and/or external storage devices described above. Memory 1210 may also be configured to implement one or more data structures 1225, such as one or more data structures for rendering synthetic images using a function representation conversion module 910 to generate samples 906. Data structures 1225 may be accessible by processor(s) 1230 and/or GPU 1240 when executing graphics application 1220 or other program instructions 1215.

As shown in FIG. 12, processor(s) 1230 may be coupled to one or more of the other illustrated components by at least one communications bus, such as interconnect 1260 (e.g., a system bus, LDT, PCI, ISA, or other communication bus type), and a network interface 1250 (e.g., an ATM interface, an Ethernet interface, a Frame Relay interface, or other interface). The CPU 1230, the network interface 1250, and the memory 1210 may be coupled to the interconnect 1260.

It should also be noted that one or more components of system 1200 might be located remotely and accessed via a network.

As noted above, in some embodiments, memory 1210 may include program instructions 1215, comprising program instructions configured to implement graphics application 1220, as described herein. Graphics application 1220 may be implemented in various embodiments using any desired programming language, scripting language, or combination of programming languages and/or scripting languages, e.g., C, C++, C#, Java™, Perl, etc. For example, in one embodiment, graphics application 1220 may be JAVA based, while in another embodiments, it may be implemented using the C or C++ programming languages. In other embodiments, graphics application 1220 may be implemented using specific graphic languages specifically for developing programs executed by specialize graphics hardware, such as GPU 1240. In addition, graphics application 1220 may be embodied on memory specifically allocated for use by graphics processor(s) 1240, such as memory on a graphics board including graphics processor(s) 1240. Thus, memory 1210 may represent dedicated graphics memory as well as general-purpose system RAM, in various embodiments. Memory 1210 may in some embodiments also include a data store configured to store image data for one or more input images or other graphics information and/or output images, or other information for use in computer graphics such as environment maps and reflectance functions, in various embodiments. Other information not described herein may be included in memory 1210 and may be used to implement the methods described herein and/or other functionality of computer system 1200.

Network interface 1250 may be configured to enable computer system 1200 to communicate with other computers, systems or machines, such as across a network. Network interface 1250 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 1200 is interconnected may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 1250 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 1240 may be implemented in a number of different physical forms. For example, GPU 1240 may take the form of a dedicated graphics card, an integrated graphics solution and/or a hybrid solution. GPU 1240 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 12, memory 1210 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory onboard than discrete or dedicated graphics cards to make up for the high latency of system RAM. Data communicated between the graphics processing unit 1240 and the rest of the computer system 1200 may travel through a graphics card slot or other interface, such as interconnect 1260 of FIG. 12.

Computer system 1200 may also include one or more additional I/O interfaces, such as interfaces for one or more user input devices 1270, or such devices may be coupled to computer system 1200 via network interface 1250. For example, computer system 1200 may include interfaces to a keyboard, a mouse or other cursor control device, a joystick, or other user input devices 1270, in various embodiments. Additionally, the computer system 1200 may include one or more displays (not shown), coupled to processors 1230 and/or other components via interconnect 1260 or network interface 1250. Such input/output devices may be configured to allow a user to interact with graphics application 1220 to request or invoke various computer graphics operations and/or to specify various parameters, thresholds, and/or other configurable options available to the user when performing computer graphics tasks while executing graphic application 1220. It will be apparent to those having ordinary skill in the art that computer system 1200 may also include numerous other elements not shown in FIG. 12.

Note that program instructions 1215 may be configured to implement a graphic application 1220 as a stand-alone application, or as a module of another graphics application or graphics library, in various embodiments. For example, in one embodiment program instructions 1215 may be configured to implement graphics applications such as painting, publishing, photography, games, animation, and/or other applications, and may be configured to render and/or edit synthetic images as part of one or more of these graphics applications. In another embodiment, program instructions 1215 may be configured to implement the techniques of various embodiments as described herein in one or more functions called by another graphics application executed on GPU 1240 and/or processor(s) 1230. Program instructions 1215 may also be configured to render images and present them on one or more displays as the output of an computer graphics operation and/or to store image data for synthesized, modified and/or reconstructed images in memory 1210 and/or an external storage device(s), in various embodiments. For example, a graphics application 1220 included in program instructions 1215 may utilize GPU 1240 when modifying, rendering, or displaying images in some embodiments.

Those skilled in the art will appreciate that computer system 1200 is merely illustrative and is not intended to limit the scope of a method and apparatus for importance sampling spherical harmonics as described herein. In particular, the computer system and devices may include any combination of hardware or software that can perform the indicated functions, including computers, network devices, internet appliances, PDAs, wireless phones, pagers, etc. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method for rendering an image of a three-dimensional (3D) scene by at least one computing device, the method comprising:
   receiving, by the at least one computing device, data describing a first scene attribute affecting content in the 3D scene, the first scene attribute described using a spherical harmonic representation;
   receiving, by the at least one computing device, additional data describing a second scene attribute affecting the content in the 3D scene, the second scene attribute described using a wavelet representation that describes a mapping of the second scene attribute to the 3D scene;
   converting, by the at least one computing device, the spherical harmonic representation of the first scene attribute into a wavelet representation of the first scene attribute based, in part, on a collection of pre-integrated basis functions of the spherical harmonic representation;
   determining, by the at least one computing device, a combined effect of both the first and second scene attributes on the content of the 3D scene, the combined effect determined based on importance samples associated with the wavelet representations of the first and second scene attributes; and
   rendering, by the at least one computing device, the image of the 3D scene based at least in part on the combined effect.

2. A method as described in claim 1, wherein the first scene attribute corresponds to reflectance of at least a portion of the content in the 3D scene.

3. A method as described in claim 1, wherein the importance samples comprise sample rays in different directions over a sphere or hemisphere.

4. A method as described in claim 1, wherein the second scene attribute corresponds to lighting of the content in the 3D scene.

5. A method as described in claim 1, wherein:
   the spherical harmonic representation comprises a weighted sum of the basis functions and describes the first scene attribute over a sphere; and
   the pre-integrated basis functions comprise a product of normalization constants and an integral of Legendre polynomials associated with a region of the sphere.

6. A method as described in claim 1, further comprising:
   computing a product of the wavelet representation of the first scene attribute and the wavelet representation of the second scene attribute; and
   generating the importance samples by sampling the product of the wavelet representations of the first and second scene attributes.

7. A method as described in claim 1, further comprising rotating the spherical harmonic representation prior to the converting to align with the wavelet representation of the second scene attribute.

8. A method as described in claim 1, wherein the data describing the first scene attribute comprises a bidirectional reflectance distribution function (BRDF).

9. A method as described in claim 1, wherein the importance samples indicate an occlusion of the combined effect of light and reflectance on at least a portion of the 3D scene.

10. A method as described in claim 1, wherein the converting is further based, at least in part, on applying a one-dimensional (1D) mip map to each of the basis functions of the spherical harmonic representation.

11. A system for rendering an image of a three-dimensional (3D) scene, the system comprising:
    one or more processors; and
    memory having stored thereon computer-readable instructions that are executable to perform operations comprising:
    receiving data describing a first and second scene attribute affecting content in the 3D scene, wherein the data describes:
       the first scene attribute using a spherical harmonic representation; and
       the second scene attribute using a wavelet representation that describes a mapping of the second scene attribute to the 3D scene;
    converting the spherical harmonic representation of the first scene attribute into a wavelet representation of the first scene attribute based, in part, on a collection of pre-integrated basis functions of the spherical harmonic representation; and
    determining a combined effect of both the first and second scene attributes on the content of the 3D scene based, at least in part, on the converted spherical harmonic representation of the first scene attribute and the wavelet representation of the second scene attribute.

12. A system as described in claim 11, wherein the operations further include rendering the image of the 3D scene based at least in part on the combined effect.

13. A system, as described in claim 11, wherein the combined effect is determined based on importance samples of a product of the wavelet representation of the of the first scene attribute and the wavelet representation of the second scene attribute.

14. A system as described in claim 13, wherein the importance samples indicate an occlusion of the combined effect of light and reflectance on at least a portion of the 3D scene.

15. A system as described in claim 11, wherein the first scene attribute corresponds to reflectance of at least a portion of the content in the 3D scene.

16. A system as described in claim 15, wherein the importance samples comprise sample rays in different directions over a sphere or hemisphere.

17. A system as described in claim 11, wherein the second scene attribute corresponds to lighting of the content in the 3D scene.

18. A system as described in claim 17, wherein the data describing the second scene attribute comprises an environment lighting map of the 3D scene.

19. A method for rendering an image of a three-dimensional (3D) scene by at least one computing device, the method comprising:
    converting, by the at least one computing device, data indicative of a spherical harmonic representation of a first scene attribute affecting content in the 3D scene into a different type of representation, wherein:

the spherical harmonic representation comprises a weighted sum of basis functions that describe the first scene attribute over a sphere; and the converting is based, in part, on a collection of pre-integrations of the basis functions comprising a product of normalization constants and an integral of Legendre polynomials associated with a region of the sphere; and storing, by the at least one computing device, the converted data to enable the first scene attribute to be combined with a second scene attribute that further affects the content in the 3D scene, the second scene attribute represented by additional data using the different type of representation.

20. A method as described in claim 19, wherein the different type of representation comprises at least one of a mip map representation or a wavelet representation.

\* \* \* \* \*